Dec. 15, 1970  O. J. GAGNE  3,546,713

WASTE DISPOSAL SYSTEM FOR BOATS

Filed Feb. 10, 1969  3 Sheets-Sheet 1

INVENTOR.
OSCAR J. GAGNE
BY
ATTORNEYS

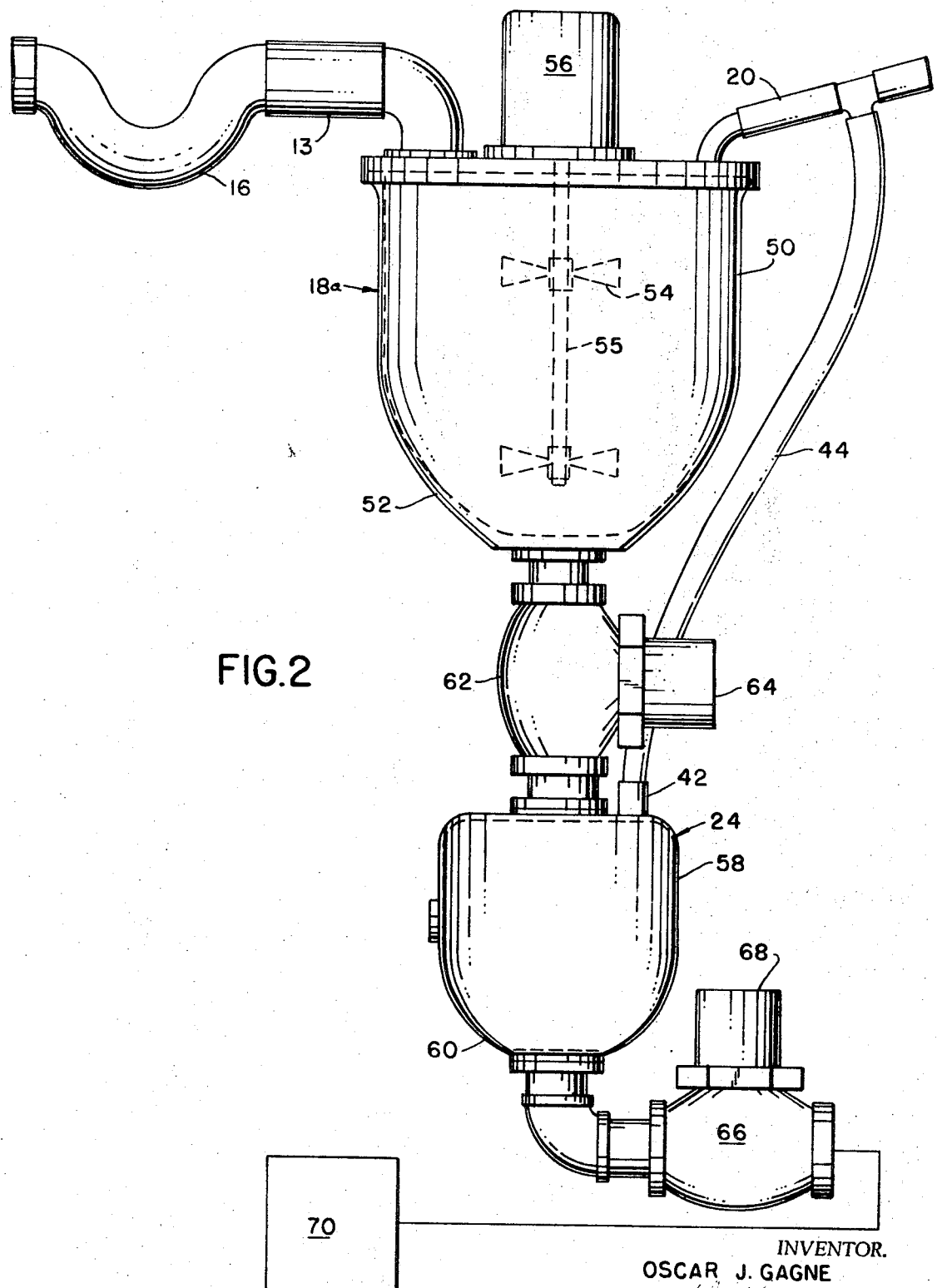

INVENTOR.
OSCAR J. GAGNE

United States Patent Office 3,546,713
Patented Dec. 15, 1970

3,546,713
WASTE DISPOSAL SYSTEM FOR BOATS
Oscar J. Gagne, 90 N. Deeplands,
Grosse Pointe, Mich. 48236
Filed Feb. 10, 1969, Ser. No. 797,760
Int. Cl. C02c *1/00, 1/40;* B01d *21/01*
U.S. Cl. 4—10                                   12 Claims

ABSTRACT OF THE DISCLOSURE

Toilet wastes are preferably macerated or comminuted and advanced to a storage tank. Measured small increments are successively withdrawn from the storage tank to a treatment tank and are there heated to a temperature sufficiently high to sterilize the waste. Thereafter, the sterilized waste is filtered to remove solids and the liquid pumped over the side of the boat.

BRIEF SUMMARY OF THE INVENTION

A serious problem to boat users has been posed by recent legislation making it illegal to discharge untreated toilet wastes over the side.

In accordance with the present invention, toilets on a boat are connected to discharge into a storage tank of substantial capacity, preferably, after the wastes have been macerated or ground to a relatively fine condition. As soon as a minimum quantity has been collected in the storage tank automatic means are actuated to pump a measured quantity to a treatment tank. This measurement is conveniently accomplished by positioning a liquid level sensor adjacent the top of the treatment tank. The treatment tank includes means such for example as electrical resistance heating elements, for heating the liquid and semi-liquid material in the treatment tank.

The material in the treatment tank is brought to a specific temperature and held for a specific period, as may be required by governmental regulations. Alternatively, the heating may continue to bring the temperature of the material to a predetermined level such that it is not required to hold the material at that level for any duration. Thereafter, the heating elements are de-energized and the material is pumped from the treatment tank through a settling and/or filter tank where the solid materials are extracted. The liquid residue passes beyond and is pumped over the side in a purified condition so as to meet governmental regulations.

BRIEF DESCRIPTION OF THE DRAWINGS

FIG. 2 is an enlarged elevational view essentially of the storage and treatment tanks.

DETAILED DESCRIPTION OF THE INVENTION

Figure 1:
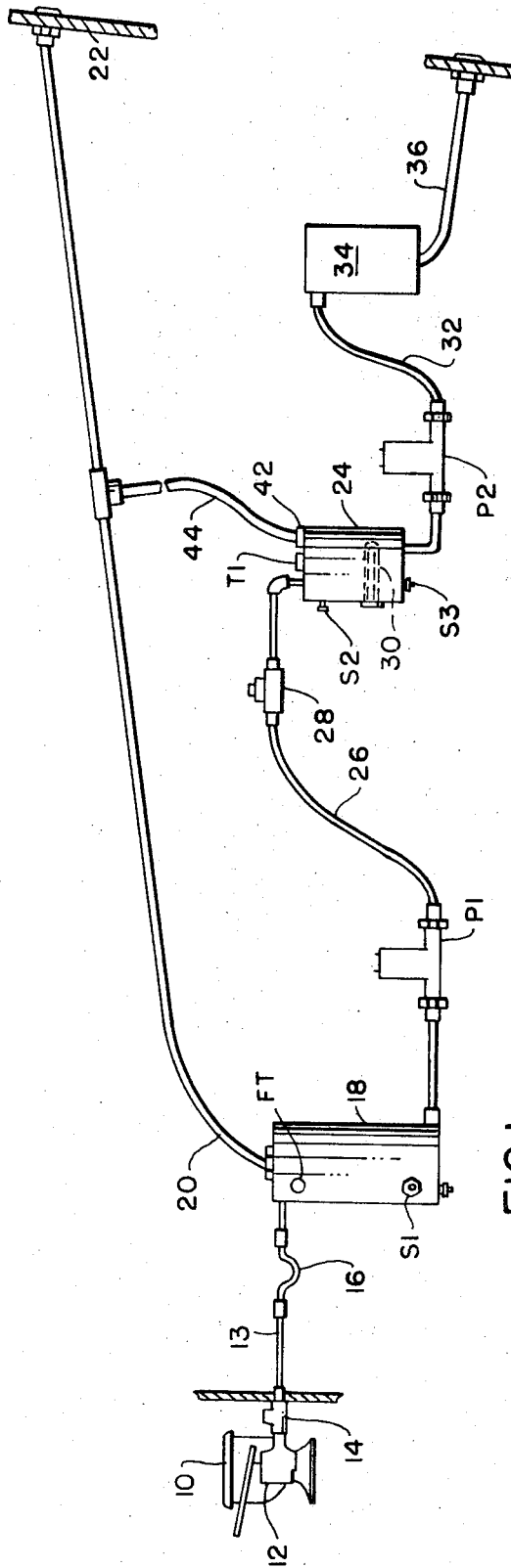
FIG. 1 is a diagrammatic layout of the waste disposal system.

Referring first to FIG. 1 the system, for convenience, is illustrated as connected to a single head or toilet 10 which is here shown as provided with a manually operated pump 12 to discharge material through a conduit system 13 including a check valve 14 and through a trap 16 into a storage tank 18.

Alternatively, instead of the hand operated pump 12, the head 10 may be provided with a motor driven pump and grinder of a type which is conventionally used today on toilets provided on small boats. The pump or unit 12, illustrated in FIG. 1 may thus be considered as illustrating alternatively a manually operated pump or a combined electrically driven pump and grinder.

The storage tank 18 may have a size dependent upon the size of the boat, but in any case is expected to have sufficient capacity to receive a number of discharge operations from the toilet 10. Obviously, a plurality of toilets may be provided, in which case the size of the storage tank may be correspondingly larger.

The storage tank 18 includes a sensor S1 adapted to respond to the liquid or fluid level in the tank. If, for example, the capacity of the storage tank 18 and the effective capacity of a treatment tank later to be described, is two gallons, sensor S1 is located to be actuated when approximately two gallons are received in the storage tank 18. This is to prevent actuation of the system together with sequential operation of pumps and heating elements, as will later be described, upon accumulation of a relatively minor quantity of liquid material in the bottom of the reservoir or storage tank 18.

Adjacent the top of the tank 18 there is provided a full tank sensor FT which is adapted to energize a signal light to indicate that the storage tank is full and that hence, the head is not usable.

Connected to the top of the storage tank 18 is a vent line 20 which extends to an external outlet 22 located at the side of the boat.

A treatment tank 24 is provided and is connected by conduit means indicated generally at 26 to the lower end of the storage tank 18. The treatment tank is adapted to contain a much smaller quantity of waste material, as for example two gallons. Intermediate the storage tank 18 and the treatment tank 24 there is provided a first pump P1 adapted to pump material from the storage tank 18 to the treatment tank 24 through a suitable check valve 28 which prevents backflow of waste from the treatment tank 24 during the purification cycle.

The treatment tank 24 is provided adjacent its top with a level sensor S2 adapted to terminate operation of the pump P1 when the measured quantity of waste material, as for example two gallons, has entered the treatment tank 24.

The treatment tank 24 is provided with heating means which as illustrated, take the form of electrical resistance heating elements 30. The treatment tank is also provided with means responsive to the temperature of the waste material in the treatment tank. This temperature responsive sensor is indicated at T1 and is illustrated diagrammatically in the figure as positioned in the top wall of the treatment tank. Alternatively, this temperature sensor may be locaed adjacent the bottom of the treatment tank so that it remains subjected to the influence of the heated waste material in the treatment tank so long as the treatment tank contains any material. In practice, it may be located anywhere to respond to the temperature of the liquid material in the treatment tank.

In addition, the treatment tank 24 is provided with a sensor S3, preferably located in or adjacent the bottom wall thereof to respond when the tank becomes empty after having previously been filled. This sensor is used in the control circuit as will later be described, for the purpose of starting a second purification cycle.

Treated material in the treatment tank 24 is discharged from the bottom thereof through conduit means indicated generally at 32 through a pump P2 which is automatically controlled as subsequently described. The purified waste material is discharged through a filter box 34 which contains disposable bag type filters adapted to separate solid particles from the purified waste material. The liquid residue is discharged through the outlet conduit 36 over the side through a fitting 38 in the side wall 40 of the boat, preferably at a point below the water line.

The liquid material in the treatment tank 24 during purification is brought to a relatively high temperature as for example 300 or 350 degrees, with the result that internal pressure within the tank reaches pressures substantially above atmospheric pressure. The check valve 28 and the pump P2 when not operating, serve to retain the pressure within the treatment tank. However, as a safety precaution a safety valve 42 is provided in the top of the treatment tank and is connected by a passage 44 to the vent passage 20 previously described. It of course will be understood that the safety valve is normally closed and is opened only when anticipated operating pressures are substantially exceeded.

From the foregoing it will be apparent that there has been provided an efficient system of handling toilet wastes on vehicles, particularly small boats which permits maximum utilization of a head or heads and which at the same time complies fully with governmental requirements in that only liquid materials subjected to prescribed purification are pumped over the side.

While the foregoing is a description of the general construction, reference is now made to FIG. 2 as showing a preferred arrangement of some of the components of the system. In this figure the storage tank, here designated 18a, is shown as connected to the conduit means 13 and the trap 16. The storage tank 18a at its upper portion has vertical cylindrical side walls as indicated at 50, and the lower portion is smoothly rounded as indicated at 52 to tend to eliminate accumulation of solid material on the bottom wall thereof. The interior of the storage tank is provided with mixing propellers 54 secured to a vertical shaft 55 adapted to be driven from an electric motor 56 carried by the top wall of the storage tank 18a.

The treatment tank, here designated 24a, is of similar shape to the storage tank in that its upper portion is provided with a vertical cylinder as indicated at 58, whereas its lower portion is smoothly rounded as indicated at 60 to eliminate the flat bottom wall on which waste material might accumulate.

In the construction here illustrated the storage tank 18a and the treatment tank 24a are interconnected directly by a solenoid actuated valve 62 which includes the actuating solenoid indicated at 64. This permits direct passage of material from the storage tank 18a to the treatment tank 24a without the necessity of providing an intermediate pump P1. However, in the automatic cycling of the system it will be appreciated that actuation of the solenoid 64 permitting gravity flow of material from the storage tank to the treatment tank is equivalent to operation of the pump.

It will of course further be appreciated that determination of whether or not a pump is required, depends in large part on space available for the system in any particular boat. Thus, if it is impractical from a space standpoint to provide the treatment tank directly below the storage tank, the necessary flow can be provided alternatively by the provision of a pump such as the pump P1.

In FIG. 2 there is also illustrated a second solenoid operated valve 66 having the solenoid 68 connected thereto for controlling flow of treated material from the treatment tank 24a to ultimate disposal. Again, if this flow can be accomplished by gravity, opening of the solenoid valve 66 is equivalent in the system operation to energization of the pump P2.

In FIG. 2 the discharge flow from the treatment tank 24a is through the filter box 70 which will contain the removable and replaceable well known cartridge type filter.

It will be observed in FIG. 2 that the safety valve 42 is provided connected by the conduit 44 to the vent passage 20, all as previously described in connection with the diagrammatic arrangement of FIG. 1.

It will further be understood of course that the storage tank 18a is equipped with a level sensor S1 and that the treatment tanks 24a is equipped with level sensors S2 and S3 as well as the temperature sensor T1, all as illustrated in FIG. 1.

Figure 4:
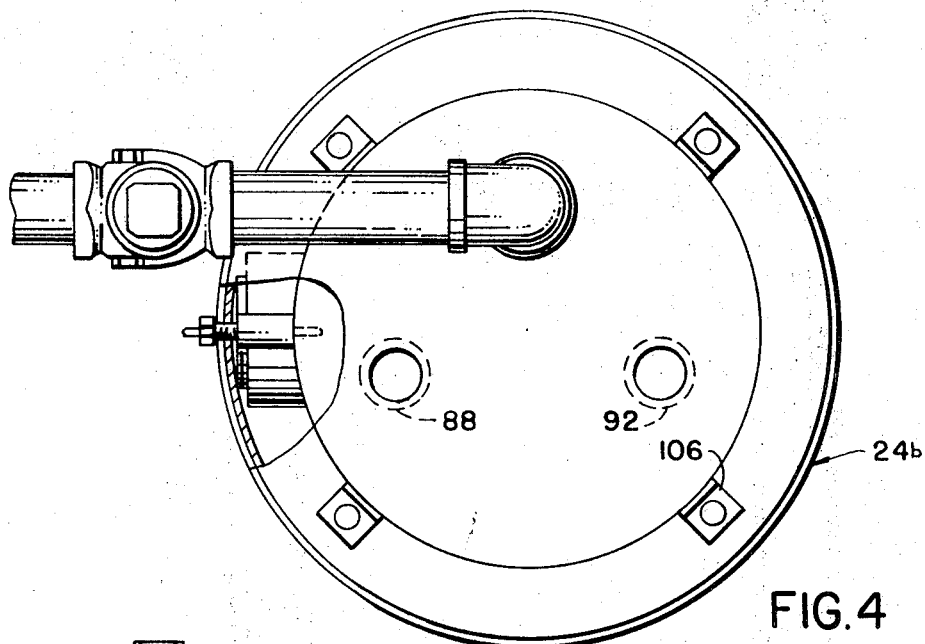
FIG. 4 is a plan view of the tank shown in FIG. 1.
Figure 3:
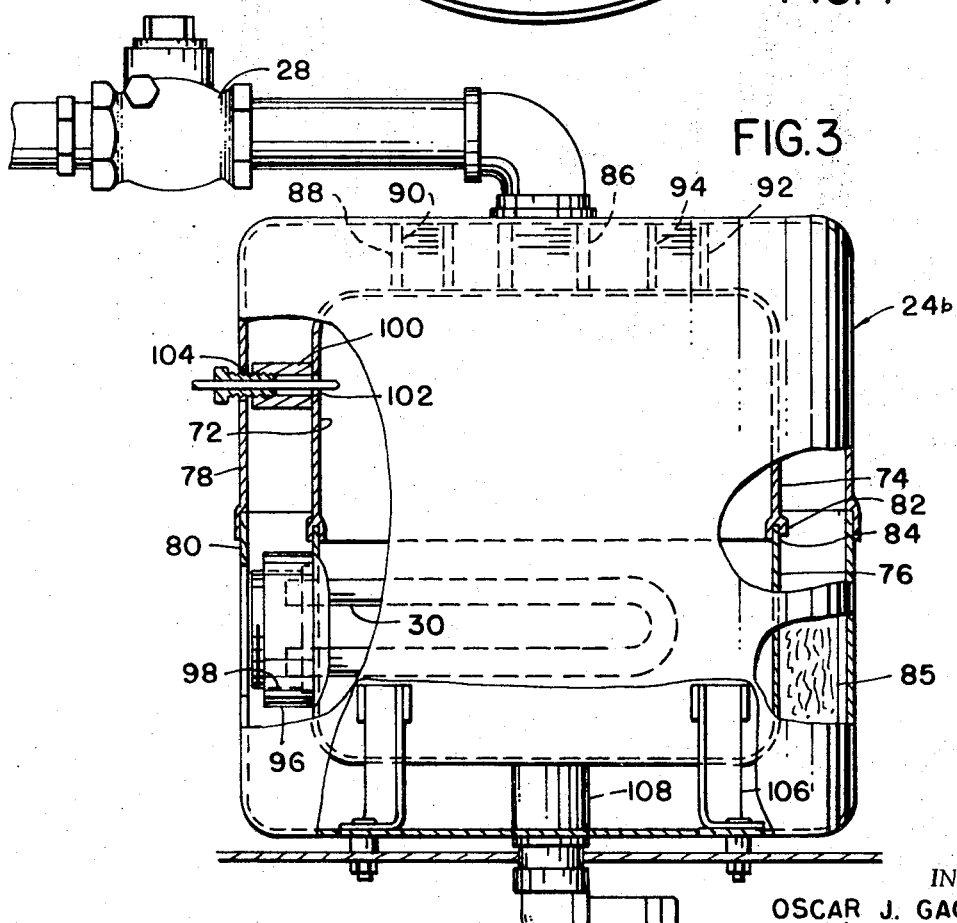
FIG. 3 is an enlarged elevational view of a preferred construction of the treatment tank.

Referring now to FIGS. 3 and 4 there is illustrated in further detail a preferred form of treatment tank, here designated 24b. The treatment tank as seen in these figures, is generally in the form of a cylinder with its axis vertical. The tank comprises an inner pressure chamber or vessel 72 formed of upper and lower cylindrical cup-shaped parts 74 and 76 respectively. The inner chamber or vessel 72 is enclosed by an outer two-part cover formed of upper and lower generally cylindrical cup-shaped members 78 and 80 respectively. The upper cup-shaped portion 74 of the pressure chamber 72 terminates in a downwardly extending channel structure 82 adapted to receive the upper edge 84 of the lower portion 76, and the two edges are welded together where they overlap so as to provide the necessary sealed construction capable of retaining appreciable above atmospheric pressure.

Intermediate the pressure chamber 72 and the cover comprising the members 78 and 80, is an insulating layer 85 of suitable material such for example as fiber glass. This conveniently is cemented to the pressure chamber or vessel 72 after the two halves 74 and 76 have been welded together.

Inlet into the treatment tank 24b is through a fitting 86 connected to conduit means 26 as disclosed in FIG. 1 including the check valve 28 therein.

Spanning the top walls of the inner and outer chambers of the treatment tank 24b is a tubular adapter 88 including a threaded portion 90 adapted to receive the temperature responsive sensor T1. A similar tubular adapter indicated at 92 is provided with interior threads as indicated at 94 for the attachment of the safety valve 42 shown in FIGS. 1 and 2.

An enlarged tubular adapter 96 is provided adjacent the bottom of the treatment tank 24b which is interiorly threaded as indicated at 98 for the insertion and attachment of the electrical heating elements 30.

A tubular adapter 100 is provided for supporting the level sensor S2. This adapter as illustrated in FIG. 3, is welded to the exterior of the inner chamber 82 surrounding an opening 102 therein and extends toward but terminates short of engagement with the outer wall 78. The wall 78 is provided with an opening 104 through which the sensor S2 extends.

It will be understood that a similar or identical adapter is provided adjacent the bottom wall of the pressure vessel 72 but has not been illustrated in FIG. 3.

The inner vessel or chamber 72 is supported from the bottom wall of the cover structure by brackets 106 which as illustrated are bolted or similarly secured to the bottom wall of the lower cup-shaped cover member 80 and welded to the bottom member 76 of the pressure vessel.

Outlet from the treatment tank 24b is through a fitting 108 connected to an elbow 110 which is adapted to connect to the discharge pump as illustrated in FIG. 1, or alternatively, the solenoid operated valve 66 shown in FIG. 2.

Figure 5:
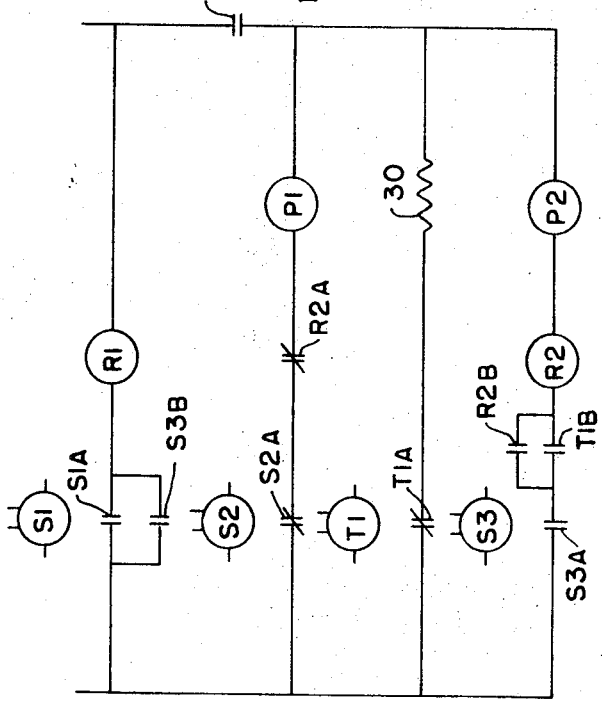
FIG. 5 is a wiring diagram showing automatic controls for the system.

Referring now to FIG. 5 there is shown a simplified wiring diagram containing the sensors S1, S2, T1, and S3 as previously described.

In overall operation, when the storage tank 18 has at least two gallons of liquid therein, the liquid is sensed by sensor S1. Sensor S1 closes normally open contacts S1A, whereby the relay coil R1 is energized. Energization of the relay coil R1 will close the normally open contacts R1A, which will energize the pump 1 through the normally closed contacts S2A and R2A, whereby fluid from the storage tank 18 is pumped to the treatment tank 24. At the same time the heater 30 is energized through the normally closed contacts T1A so that the treatment tank 24 is heated. When the fluid from tank 18 has filled the tank 24 to the proper level, the sensor S2 is energized to open the contacts S2A and thus de-energized the pump P1 to prevent flow of additional fluid from the tank 18 to the tank 24 at this time. Initial flow of fluid to the tank 24, before there has been a sensible lowering of the level of fluid in the tank 18, will operate the sensor S3 to close normally open contacts S3B and thus to establish a holding circuit around the contacts S1A. This will have the effect of insuring the completion of a cycle including filling the tank 24, bringing its contents to the required temperature, and thereafter completely emptying the treatment tank, even though the level of liquid in the storage tank 18 was initially only slightly above the sensor S1.

After the temperature in the tank 24 has reached a predetermined value sufficient to ensure proper purification of material in treatment tank 24, the temperature sensor T1 which senses the temperature of the material in the tank 24, is energized and will cause the contacts T1A to open, shutting off the heater 30.

When fluid was first pumped to the treatment tank 24, actuating the sensor S3, normally open sensor contacts S3A were closed and remain closed while the treatment tank 24 is being filled, the contents are heated to the required temperature, and the tank is subsequently completely emptied.

When the temperature sensor T1 is energized upon attainment of a predetermined temperature, the normally open contacts T1B are closed to initiate operation of the pump P2 through the contacts T1B, contacts S3A, and the relay coil R2. A holding circuit is established through contacts R2B, and pump P2 will thus continue to operate until sensor S2 opens contacts S3A upon the tank 24 becoming completely empty.

Energization of relay coil R2 will open relay contacts R2A to prevent energizing of the pump P1 until the tank 24 is empty as sensed by the sensor S3. When the tank 24 has been emptied by the pump P2 which pumps the now sterilized fluid from the tank 24 through the filter box 34 and out of the system, the sensor S3 senses the emptying of the tank 24 and opens the contacts S3A, whereby the relay coil R2 is de-energized and pump P2 stopped. The relay contacts R2A are again closed and the pump P1 can again be energized on sensing of minimum required liquid in the tank 18 by the sensor S1.

Accordingly, so long as the storage tank 18 is filled above the minimum level as determined by the sensor S1, the treatment tank 24 is repeatedly filled, its contents purified and emptied. Immediately upon emptying of the treatment tank 24 a further measured quantity of material is delivered from the storage tank 18 to the treatment tank 24. This cycle continues, thus giving maximum utilization of the heads on the boat, until such time as the remaining quantity of material in the storage tank 18 is below the level of the sensor S1.

When the sensor S3 senses emptying of the treatment tank 24, a cycle has been completed. At this time contact S3B will open and if liquid in the storage tank 18 reaches the level of sensor S1, a new charge will be delivered to the temperature tank and the cycle repeated.

Figure 6:
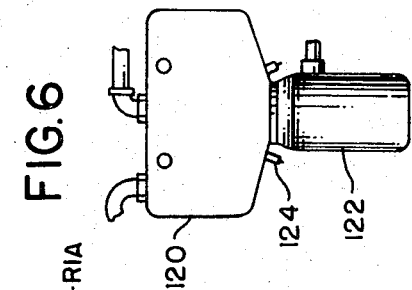
FIG. 6 is a fragmentary diagrammatic view showing a modification of the system.

In FIG. 6 there is shown a modification of the system in which the storage tank or reservoir 120 is provided at its lower end with a grinder and liquefying means 122 which is adapted to grind up the solid waste material in the reservoir into small particles before it passes to the treatment tank. In this case it will be observed that a sensor 124, which corresponds to the sensor S1, is provided to be actuated when the grinder and liquefying unit 122 has received the amount of waste material adapted to form a single charge for the treatment tank.

In referring to maintaining the waste at or above a predetermined temperature for a predetermined time interval, it will be understood as previously described that this may be accomplished by simply bringing the waste to a temperature sufficiently above the minimum purification temperature to insure maintaining the waste above such minimum purification temperature for a predetermined time interval.

What I claim as my invention is:

1. An automatically operated toilet waste treatment and disposal system for use with a vehicle, such as a boat, airplane or bus, comprising
   a sealed treatment tank,
   means for introducing into said tank a measured quantity of substantially liquid toilet waste in which the solids are finely divided,
   means for subjecting the waste to a purification cycle comprising heating means in said treatment tank effective to bring the liquid waste to predetermined elevated purification temperature and to maintain said waste at or above said predetermined temperature for a predetermined time interval, and
   means responsive to completion of the purification cycle of the waste to empty the treatment tank and to discharge at least the liquid portion thereof from the vehicle.

2. A system as defined in claim 1 which comprises a storage tank having a capacity several times that of said treatment tank,
   and means responsive to the accumulation of sufficient waste in said storage tank and empty condition of said treatment tank to deliver a measured quantity of waste to said treatment tank, and to initiate operation of said heating means.

3. A system as defined in claim 1 in which the means responsive to completion of the purification cycle of the waste comprises means responsive to the temperature of waste material in said treatment tank.

4. A system as defined in claim 2 in which the means responsive to completion of the purification cycle of the waste comprises means responsive to the temperature of waste material in said treatment tank.

5. A system as defined in claim 2 comprising mixing means in said storage tank operable to maintain a substantially uniform dispersal of comminuted solid material in the waste material.

6. A system as defined in claim 1 comprising means for comminuting the solids in said waste prior to delivery to said treatment tank.

7. A system as defined in claim 6 comprising mixing means in said storage tank operable to maintain a substantially uniform dispersal of comminuted solid material in the waste material.

8. A system as defined in claim 1 comprising removable and disposable bag type filter means at the outlet side of said treatment tank to remove purified solids from said waste prior to discharge of the liquid portion thereof.

9. A system as defined in claim 2 comprising a control system for handling and treatment of waste material in said system comprising first means for sensing the presence of at least a minimum quantity of waste in said storage tank, second means in said treatment tank for sensing accumulation of a measured quantity of waste therein, third means in said treatment tank for sensing the empty condition thereof following discharge of treated waste therefrom, and means in said treatment tank responsive to a condition thereof corresponding to purification of the waste, first flow control means intermediate said storage tank and said treatment tank, and second flow control means at the outlet side of said treatment tank, said first means being operable when said treatment tank is empty as determined by said third means to operate said first flow control means to deliver waste to said treatment tank, said second means being operable to operate said flow control means to terminate delivery of waste to said treatment tank, one of said first and second means being operable to initiate operation of said heating means, said condition responsive means being operable to actuate said second flow control means to empty purified waste from said treatment tank, said third means being operable when said treatment tank is empty to actuate said first and second flow control means to terminate flow out of said treatment tank and initiate flow from said storage tank to said treatment tank if said storage tank contains a predetermined minimum of waste.

10. A system as defined in claim 9 in which said flow control means comprise pumps.

11. A system as defined in claim 9 in which said flow control means comprise solenoid actuated valves.

12. A system as defined in claim 2 which comprises means intermediate the storage tank and the treatment tank for comminuting and liquefying the solid materials in the waste prior to the discharge thereof into the treatment tank.

References Cited
UNITED STATES PATENTS

| | | | |
|---|---|---|---|
| 2,131,711 | 9/1938 | Porteous | 4—8UX |
| 2,658,202 | 11/1953 | Wolman et al. | 4—8 |
| 3,079,612 | 3/1963 | Corliss | 4—10 |
| 3,098,144 | 7/1963 | Dale | 4—131 |
| 3,175,688 | 3/1965 | Zink | 210—149 |
| 3,190,725 | 6/1965 | Van Den Berg | 4—8X |
| 3,202,118 | 8/1965 | Baldine | 4—131X |
| 3,317,047 | 5/1967 | Hansen | 4—115X |
| 3,320,621 | 5/1967 | Vita | 4—10 |
| 3,396,410 | 8/1968 | Gray | 4—10X |

LAVERNE D. GEIGER, Primary Examiner

H. K. ARTIS, Assistant Examiner

U.S. Cl. X.R.

4—8; 210—149